(12) United States Patent
Tengler et al.

(10) Patent No.: US 8,994,522 B2
(45) Date of Patent: Mar. 31, 2015

(54) HUMAN-MACHINE INTERFACE (HMI) AUTO-STEER BASED UPON-LIKELIHOOD TO EXCEED EYE GLANCE GUIDELINES

(75) Inventors: Steven C. Tengler, Gross Pointe Park, MI (US); Bijaya Aryal, Macomb Township, MI (US); Scott P. Geisler, Clarkston, MI (US); Michael A. Wuergler, Clarkston, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 13/116,664

(22) Filed: May 26, 2011

(65) Prior Publication Data

US 2012/0299714 A1 Nov. 29, 2012

(51) Int. Cl.
  *B60Q 1/00* (2006.01)
  *G10L 21/00* (2013.01)
  *B60K 35/00* (2006.01)
  *B60K 37/06* (2006.01)
(52) U.S. Cl.
  CPC ............... *B60K 35/00* (2013.01); *B60K 37/06* (2013.01); *B60K 2350/1004* (2013.01); *B60K 2350/1044* (2013.01); *B60K 2350/1052* (2013.01)
  USPC ........... 340/439; 340/576; 340/990; 704/201; 704/235; 704/270; 704/275; 704/276; 704/E21.001; 704/E11.001; 701/1; 701/45; 455/466
(58) Field of Classification Search
  CPC ...................................................... G10L 15/26
  USPC ...................................................... 340/439
  See application file for complete search history.

(56) References Cited

U.S. PATENT DOCUMENTS

| | | | | |
|---|---|---|---|---|
| 5,404,443 A | * | 4/1995 | Hirata | 725/75 |
| 6,415,224 B1 | * | 7/2002 | Wako et al. | 701/409 |
| 7,567,861 B2 | * | 7/2009 | Inagaki | 701/1 |
| 8,083,588 B2 | * | 12/2011 | Pryor | 463/31 |
| 2001/0047263 A1 | * | 11/2001 | Smith et al. | 704/275 |
| 2002/0069071 A1 | * | 6/2002 | Knockeart et al. | 704/275 |
| 2006/0293799 A1 | * | 12/2006 | Powers et al. | 701/1 |

(Continued)

OTHER PUBLICATIONS

Aguilo, "Development of Guidelines for In-Vehicle Information Presentation: Text vs. Speech" May 12, 2004, Thesis submitted to the Faculty of the Virginia Polytechnic Institute and State University. pp. 7-8, 23, 39, 49-54.*

*Primary Examiner* — Firmin Backer
*Assistant Examiner* — Adnan Aziz
(74) *Attorney, Agent, or Firm* — Leydig, Voit & Mayer, Ltd.

(57) ABSTRACT

The described method and system provide for HMI steering for a telematics-equipped vehicle based on likelihood to exceed eye glance guidelines. By determining whether a task is likely to cause the user to exceed eye glance guidelines, alternative HMI processes may be presented to a user to reduce ASGT and EORT and increase compliance with eye glance guidelines. By allowing a user to navigate through long lists of items through vocal input, T9 text input, or heuristic processing rather than through conventional presentation of the full list, a user is much more likely to comply with the eye glance guidelines. This invention is particularly useful in contexts where users may be searching for one item out of a plurality of potential items, for example, within the context of hands-free calling contacts, playing back audio files, or finding points of interest during GPS navigation.

16 Claims, 4 Drawing Sheets

(56) References Cited

U.S. PATENT DOCUMENTS

| | | | |
|---|---|---|---|
| 2008/0133228 A1* | 6/2008 | Rao | 704/231 |
| 2009/0248419 A1* | 10/2009 | Spaulding et al. | 704/275 |
| 2010/0250243 A1* | 9/2010 | Schalk et al. | 704/201 |
| 2012/0041633 A1* | 2/2012 | Schunder et al. | 701/29.2 |
| 2012/0271639 A1* | 10/2012 | Hanson | 704/275 |

\* cited by examiner

HUMAN-MACHINE INTERFACE (HMI) AUTO-STEER BASED UPON-LIKELIHOOD TO EXCEED EYE GLANCE GUIDELINES

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

With the increased functionality that telematics units offer to users, distractions from driving may become more and more problematic, as drivers using their telematics units for purposes such as GPS navigation, music playback, and other services, may be prone to taking their eyes off the road to navigate the telematics unit's human machine interface (HMI). The Alliance of Automotive Manufacturers (the "Alliance") has issued guidelines for metrics such as Average Single Glance Time (ASGT) and Eyes Off the Road Time (EORT). For instance. ASGT should not exceed 2 seconds and total FORT for a task should not exceed 20 seconds.

Conventional systems have sought to meet the Alliance guidelines for ASGT and EORT, which may also be referred to as "eye glance guidelines," by limiting telematics unit functionality or accessibility. However, drivers wish to have full access to all the capabilities of their telematics units no matter the situation. Thus, it is an object in part to provide a system and method for allowing a user of a telematics unit to stay within the Alliance guidelines for ASGT and FORT while providing full access to telematics services. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for HMI steering for a telematics equipped vehicle based on likelihood to exceed eye glance guidelines. The method comprises receiving a user input relating to a task, determining whether the task is likely to cause the user to exceed eye glance guidelines, and, if the task is determined as being likely to cause the user to exceed eye glance guidelines, steering the user to an alternative HMI screen different from the HMI screen that the user would have been steered to if the task was determined as not being likely to cause the user to exceed eye glance guidelines. The task may be related to telematics services such as hands-free calling, infotainment, GPS navigation, and may correspond to displaying a plurality of items within a list to a user, such as lists of contacts, audio files, and points of interest.

Determining whether the task is likely to cause the user to exceed eye glance guidelines may include determining whether the task is likely to cause the user to exceed guidelines for ASGT (average single glance time) or determining whether the task is likely to cause the user to exceed guidelines for EORT (eyes off the road time). This determination may be based on an amount of information that is to be presented to the user, such as when the number of items to be displayed exceeds a predetermined threshold. The alternative HMI screen presented to the user may include a request for vocal input from the user, and the telematics unit may present the user with information related to the task based on the vocal input. In other implementations, the alternative HMI screen may present a request for user input utilizing a T9 (text on nine keys) input method or present options to the user based on heuristic processing.

In a further implementation, the method may also include determining whether the vehicle is moving and steering the user to the alternative HMI screen if the task was determined as being likely to cause the user to exceed eye glance guidelines is performed only when the vehicle is determined to be moving. The invention may also be implemented in the form of computer executable instructions stored on a non-transient, tangible, computer-readable medium.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for HMI steering for a telematics-equipped vehicle based on likelihood to exceed Alliance guidelines. Conventional HMI screens (e.g., displaying entire lists of items) are presented to a user when the vehicle is not moving or when the vehicle is moving and the telematics unit determines that a user task is not likely to exceed Alliance guidelines. However, when the vehicle is moving and the telematics unit determines that a user task is likely to exceed the Alliance guidelines, an alternative HMI (e.g., utilizing voice recognition or further subdivision of lists) may be presented to the user.

Figure 1:
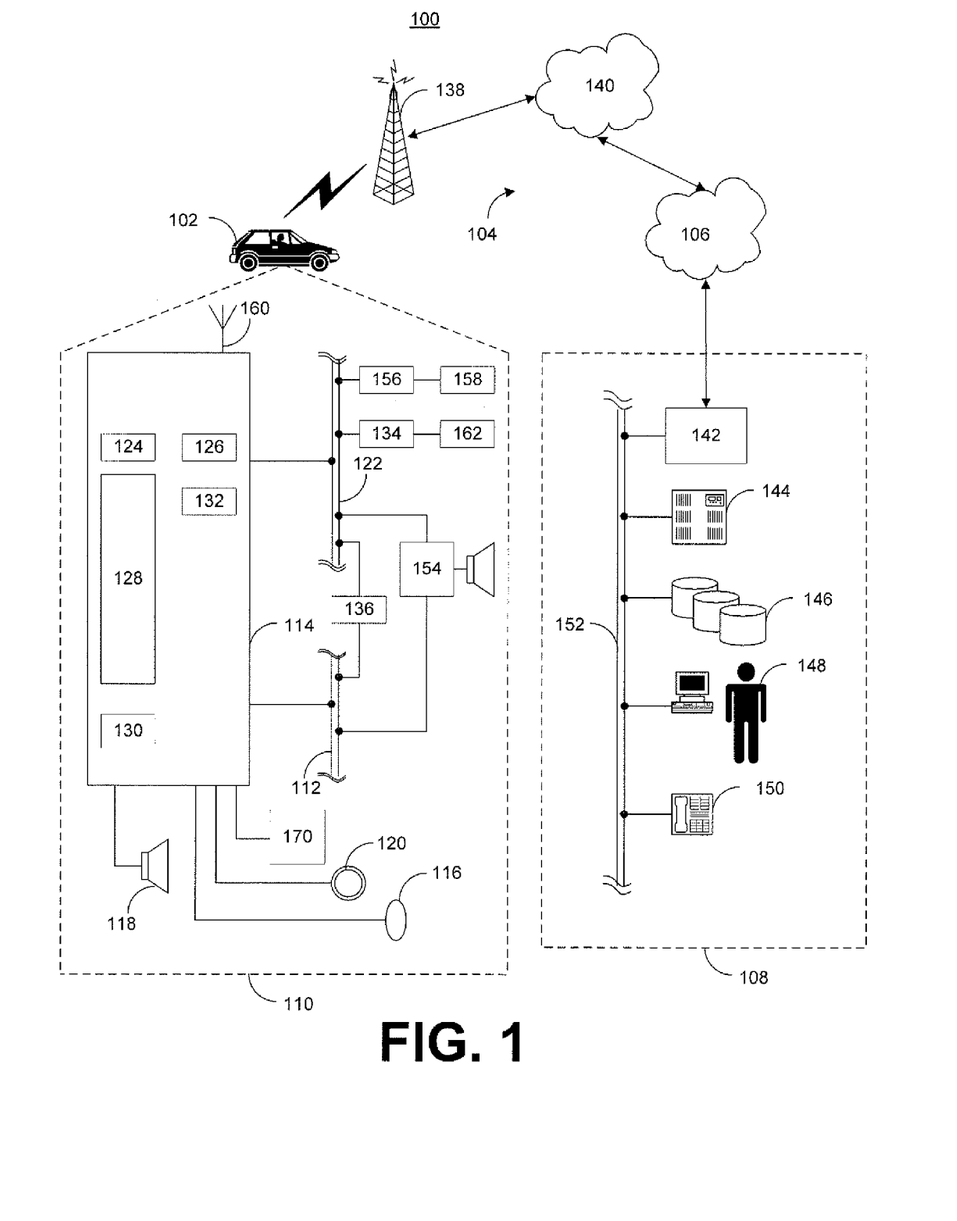
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114. The telematics unit 114 may further be connected to a display 170 through which infotainment services are provided to the user and through which the user may input commands (e.g., a touch-screen display).

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human machine interface (HMI) technology known in the art (e.g., voice recognition technology). Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services. The buttons 120 may be presented to a user as part of a touch screen in the HMI interface, or may be mechanical buttons that are part of the vehicle dashboard.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
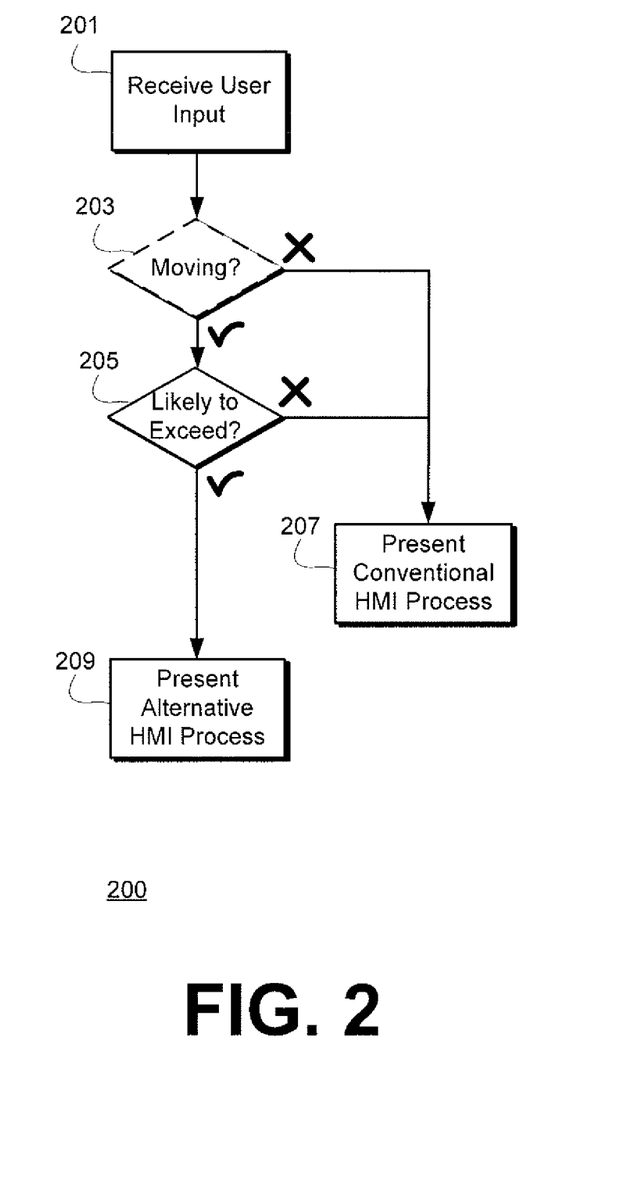
FIG. 2 is a flowchart illustrating a process for HMI steering based on likelihood to exceed Alliance guidelines in accordance with an implementation of the described principles.

With further reference to the architecture of FIG. 1, and turning more specifically to FIG. 2, a process 200 is depicted for HMI steering based on likelihood of exceeding Alliance guidelines. First, the telematics unit receives an input 201 from a user corresponding to a particular task (e.g., the user presses a button corresponding to "hands-free calling," the telematics unit provides a screen corresponding to "hand-free calling" functionality, and the user presses a button corresponding to contacts from a certain range of letters). Then, depending on whether the desired task to be performed by the user is likely to cause the user to exceed the Alliance guidelines for ASGT or EORT 205, the telematics unit may either present the user with a conventional HMI interface 207 (if the task is not likely to exceed the Alliance guidelines) or with an alternative HMI interface 209 (if the task is likely to exceed the Alliance guidelines).

In a further implementation, the telematics unit may also determine whether the vehicle is moving or not 203, and if the vehicle is not moving, the telematics unit may use the conventional HMI interface 207, but if the vehicle is moving, the telematics unit may go on to determine whether the user is likely to exceed the Alliance guidelines 205. It will be appreciated that the determination of whether the vehicle is moving 203 and whether the user is likely to exceed Alliance guidelines 205 may occur in any order. In other implementations, instead of determining whether the vehicle is moving or not 203, the telematics unit may use other criteria, such as determining whether or not the engine is on or determining whether the vehicle is only temporarily stopped (e.g. at a stoplight) and still needs to minimize ASGT and EOST time.

It will be appreciated that various methods of calculation of whether a user is likely to exceed the Alliance guidelines may be utilized. In one simple example, predetermined thresholds may be set for the HMI interface. When the user selects a button where the telematics unit will present a list of items to the user, the telematics unit may be programmed to determine that any list larger than a certain size (e.g., ten items) may be likely to cause the user to exceed the Alliance guidelines. In another example, the determination of likelihood may be based on the number or length of the words to be displayed on the screen, as well as the amount of information that requires the user to scroll down to (e.g., by pressing a scroll-down button) in order to be displayed. In yet another example, the telematics unit may employ complex algorithms that may be based on factors such as the type of task requested, user actions required, the information to be displayed, and expected ASGT or EORT values associated with those tasks, actions, or information, as well as other information such as experimental data from actual user trials. Determination of whether a task will cause a user to exceed ASGT guidelines and EORT guidelines may be performed separately as well. For example, certain tasks may not require any single glances that exceed around two seconds, but if the task requires the user to make an excessive amount of glances, it may exceed the guidelines for total EORT time. On the other hand, other tasks may not exceed the EORT guidelines, but may require the user to read so many words on the screen that the user would exceed the ASGT guidelines. It will further be appreciated that the determination of likelihood may be adjusted based on any changes to the Alliance guidelines, for example, through software/firmware updates.

Figure 3:
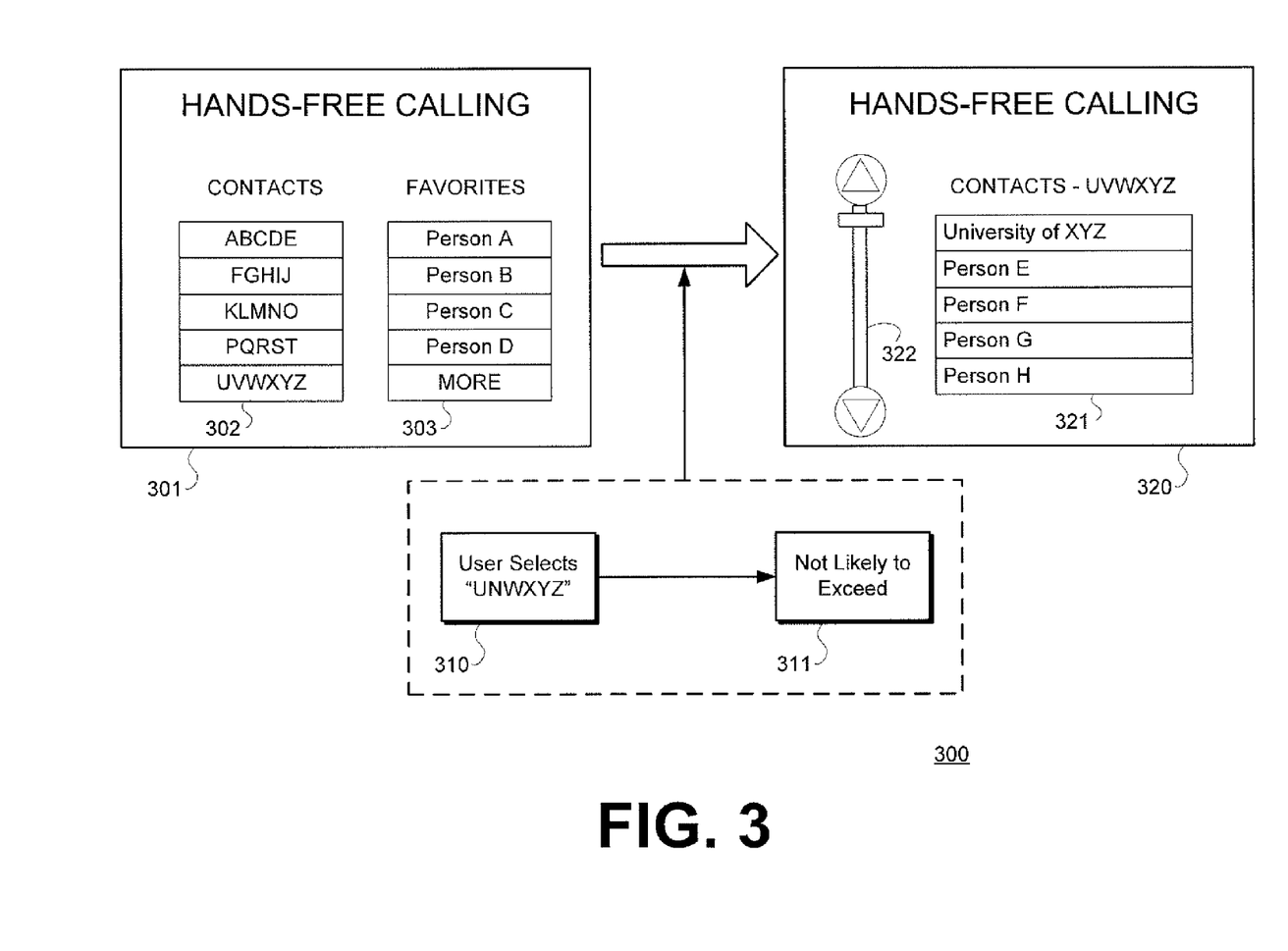
FIG. 3 is a depiction of exemplary HMI interface screens presented to a user based on likelihood of exceeding Alliance guidelines in accordance with an implementation of the described principles.
Figure 4:
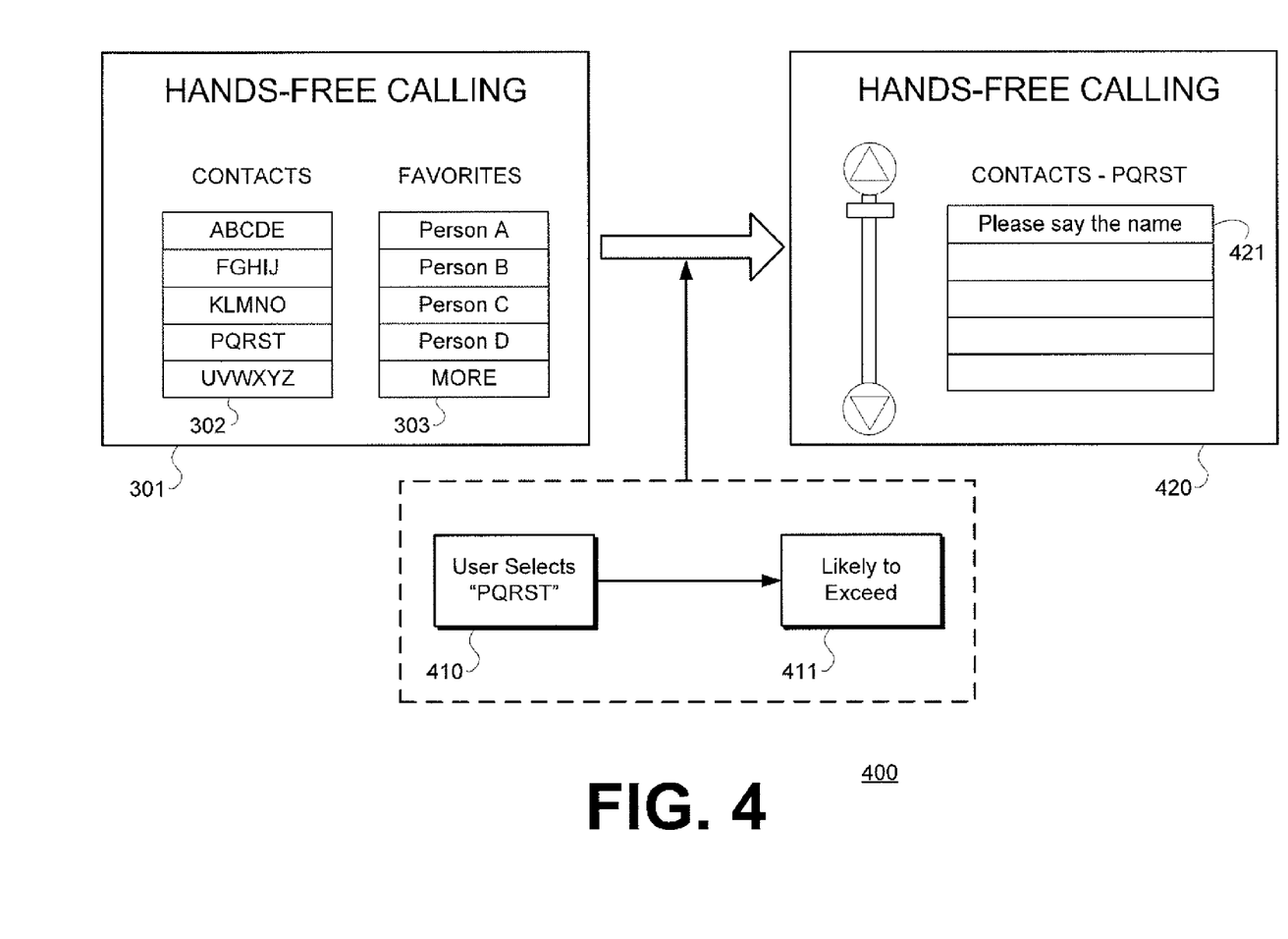
FIG. 4 is a depiction of exemplary HMI interface screens presented to a user based on likelihood of exceeding Alliance guidelines in accordance with an implementation of the described principles.

Turning more specifically to FIGS. 3-4, the process of FIG. 2 is better illustrated in the context of an exemplary task selected by the user. For clarity of illustration, the following examples will be with the determination of likelihood being based on list length. Display screen 301 shows an example of an HMI interface screen that may be presented to a user after the user selects the "hands-free calling" option from a main TSP services menu. A list of contacts 302 (grouped by letters of the alphabet as shown) and a list of favorites 303 are presented to the user. The information corresponding to these lists may be stored in a contact database within the telematics unit. The user may use the list of favorites 303 to call the people/entities they call most often by pressing the button corresponding to the desired person/entity on the screen, and thus minimizing ASGT and EORT time by avoiding the need to navigate through the contacts list 302.

In an example 300 depicted by FIG. 3, the user selects contact group "UVWXYZ" (representing contact list entries with names that begin with U, V, W, X, Y or Z) 310 and the telematics unit determines that there are only eight entries within that contact group. Given that the determination of likelihood of exceeding Alliance guidelines is based on a list being greater than ten entries, the telematics unit determines that presenting the full list to the user in the conventional manner is not likely to cause the user to exceed the Alliance guidelines 311. Thus, the telematics unit presents display screen 320 to the user, wherein the first five entries of the contact group "UVWXYZ" are displayed in a list display 321, and the other three may be accessible by pressing a scroll-down button on the scroll bar 322. The user can then select the person/entity that the user wishes to call by pressing a button. In a further implementation, the telematics unit may provide the user with the additional option of speaking the name of the person/entity that the user wishes to call at any point in the selection process, and the telematics unit may attempt to locate and/or call that person/entity based on the user's vocal input.

In an example 400 depicted by FIG. 4, the user selects contact group "PQRST" (representing contact list entries with names that begin with P, Q, R, S, or T) 410 and the telematics unit determines that there are fifty entries within that contact group. The telematics unit thus determines that presenting the full list of the user in the conventional manner will be likely to cause the user to exceed the Alliance guidelines 411, due to the large number of entries that the user will need to scroll through to reach the desired entry. As a result, the telematics unit present display screen 420 to the user, representing an alternative HMI for finding the user's desired entry. The display simply tells the user to "Please say the name" 421, and the telematics unit uses its voice processing unit utilize a user's vocal input to search for the name. The telematics unit may then directly place a call to the person/entity corresponding to the user's vocal input, or may present the user with a list of the closest matches. If there was an error (e.g., the telematics unit not being able to make sense of the user's vocal input, or the voice processing unit is malfunctioning or not installed), another alternative HMI process such as those described below may be used.

Other alternative HMI processes that may be used include presenting the users with displays (and buttons) utilizing the T9 (text on nine keys) text input selection process. For example, if the user selects a certain task (e.g., "hands-free calling") or selects a sub-list within the task (e.g., group "ABCDE"), and the telematics unit determines that the user is likely to exceed the Alliance guidelines if a conventional HMI process is used, the telematics unit may present the user with a T9 selection screen instead. In another alternative HMI process, a heuristic HMI process may be used, for example, by displaying the most commonly used list items and giving the user some alternative options (e.g., through vocal input, alphabetic selection, T9 selection, etc.) if the desired item is not one of the most common.

It will be appreciated that the principles described herein may be applied in other contexts other than "hands-free calling" as well, and slight variations in the alternative HMI process may be provided that are particularly suited for those contexts. For example, when a user wishes to select a point of interest (POI) during a GPS navigation related process, if the user is in a densely populated area, the user may be likely to exceed the Alliance guidelines if too many POIs are presented to the user. Thus, the telematics unit may present an alternative HMI screen with different sub-lists organized by category, proximity, or alphabetically. Similarly, in the context of searching for a desired audio file (e.g., MP3s) for playback, it may be more advantageous to present the user with options to sort by specific categories such as artist, album, or title before sorting alphabetically.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit.

It will be appreciated that the described system and method allows for HMI steering for a telematics-equipped vehicle based on likelihood to exceed Alliance guidelines. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for presenting a display screen for a graphical human machine interface (HMI) for a moving vehicle based on likelihood to exceed eye glance guidelines, wherein the graphical HMI is configured, for a task requiring a user to view the graphical HMI, with a conventional HMI screen and an alternative HMI screen, the method comprising:
    receiving a user input corresponding to the task requiring the user to view the graphical HMI;
    determining a user action required for the task,
    determining a time value associated with performing the user action required for the task, the time value being taken from the group consisting of:
        an associated average standard glance time (ASGT) value, and
        an associated eyes off the road time (EORT) value;
    determining whether the task would violate an eye glance guideline for the moving vehicle by comparing an eye glance guideline time value to the time value associated with performing the user action; and
    conditionally presenting only one of the conventional and the alternative HMI screens by presenting the conventional HMI screen only if the task would not violate the eye glance guideline and otherwise presenting the alternative HMI screen.

2. The method of claim 1, wherein the task involves multiple user actions,
and wherein, for each of the multiple user actions involved in the task, a time value associated with the user action is determined, the time value being taken from the group consisting of: an associated ASGT and an associated EORT.

3. The method of claim 2, wherein determining whether the task violates an eye glance guideline is based on at least one of the group consisting of: the ASGTs associated with each of the multiple user actions and the EORTs associated with each of the multiple user actions.

4. The method of claim 1, wherein determining whether the task is likely to cause the user to exceed eye glance guidelines is based on an amount of information that is to be presented to the user.

5. The method of claim 1, wherein the alternative HMI screen presents a request for vocal input from the user.

6. The method of claim 5, the method further comprising:
receiving a vocal input from the user; and
presenting the user with information related to the task based on processing of the vocal input.

7. The method of claim 1, wherein the alternative HMI screen presents a request for input from the user utilizing T9 (text on nine keys) text input.

8. The method of claim 1, wherein the alternative HMI screen presents options to the user based on heuristic processing.

9. The method of claim 1, wherein the associated ASGT value of the user action is determined from experimental data from user trials, and
wherein the associated EORT value of the user action is determined from experimental data from user trials.

10. A tangible, non-transient computer-readable medium, part of a telematics unit on a telematics-equipped vehicle, having thereon computer executable instructions for presenting a display screen for a graphical human machine interface (HMI) based on likelihood to exceed eye glance guidelines, wherein the HMI is configured, for a task requiring a user to view the graphical HMI, with a conventional HMI screen and an alternative HMI screen, the computer executable instructions comprising instructions for:
receiving a user input corresponding to the task requiring the user to view the graphical HMI;
determining a user action involved in the task,
determining a time value associated with performing the user action required for the task, the time value being taken from the group consisting of:
an associated average standard glance time (ASGT) value, and
an associated eyes off the road time (EORT) value;
determining whether the task would violate an eye glance guideline for the moving vehicle by comparing an eye glance guideline time value to the time value associated with performing the user action; and
conditionally presenting only one of the conventional and the alternative HMI screens by presenting the conventional HMI screen only if the task would not violate the eye glance guideline and otherwise presenting the alternative HMI screen.

11. The computer-readable medium of claim 10, wherein the task involves multiple user actions,
and wherein, for each of the multiple user actions involved in the task, a time value associated with the user action is determined, the time value being taken from the group consisting of: an associated ASGT and an associated EORT.

12. The computer-readable medium of claim 10, wherein the alternative HMI screen presents a request for vocal input from the user.

13. The computer-readable medium of claim 12, the computer executable instructions further comprising:
receiving a vocal input from the user; and
presenting the user with information related to the task based on processing of the vocal input.

14. The computer-readable medium of claim 10, the computer executable instructions further comprising instructions for at least one of the group consisting of:
presenting a request for input from the user utilizing T9 (text on nine keys) text input; and
presenting options to the user based on heuristic processing.

15. The computer-readable medium of claim 11, wherein determining whether the task would violate an eye glance guideline is based on at least one of the group consisting of: the ASGTs associated with each of the multiple user actions and the EORTs associated with each of the multiple user actions.

16. The computer-readable medium of claim 10, wherein the associated ASGT value of the user action is determined from experimental data from user trials, and
wherein the associated EORT value of the user action is determined from experimental data from user trials.

* * * * *